(12) United States Patent
Takasu et al.

(10) Patent No.: US 11,902,699 B2
(45) Date of Patent: Feb. 13, 2024

(54) DISPLAY DEVICE, CONTROL METHOD OF DISPLAY DEVICE, AND RECORDING MEDIUM

(71) Applicant: CASIO COMPUTER CO., LTD., Tokyo (JP)

(72) Inventors: Akihide Takasu, Akishima (JP); Tetsuro Narikawa, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 294 days.

(21) Appl. No.: 17/164,881

(22) Filed: Feb. 2, 2021

(65) Prior Publication Data

US 2021/0258533 A1 Aug. 19, 2021

(30) Foreign Application Priority Data

Feb. 19, 2020 (JP) ................................. 2020-026378
Jun. 8, 2020 (JP) ................................. 2020-099675

(51) Int. Cl.

| | |
|---|---|
| *H04N 5/63* | (2006.01) |
| *H04N 9/31* | (2006.01) |
| *G06F 1/3234* | (2019.01) |
| *G06F 3/02* | (2006.01) |
| *G06F 1/3206* | (2019.01) |

(52) U.S. Cl.
CPC ............ *H04N 5/63* (2013.01); *G06F 1/3206* (2013.01); *G06F 1/3265* (2013.01); *G06F 3/02* (2013.01); *H04N 9/3173* (2013.01); *H04N 9/3161* (2013.01)

(58) Field of Classification Search
CPC ...... H04N 5/63; H04N 9/3173; H04N 9/3161; H04N 1/00885; H04N 5/3698; G06F 1/3206; G06F 1/3265; G06F 3/02; G06F 11/3062; G06F 21/81
USPC .................................................. 348/744, 730
See application file for complete search history.

(56) References Cited

U.S. PATENT DOCUMENTS

| | | | |
|---|---|---|---|
| 10,573,208 B2 * | 2/2020 | Mitsuhashi | G09G 3/346 |
| 2005/0084234 A1 * | 4/2005 | Ejiri | H04N 9/3179 348/E5.103 |
| 2011/0025987 A1 * | 2/2011 | Furumi | G03B 21/16 353/121 |
| 2011/0069240 A1 * | 3/2011 | Su | H04N 9/3179 348/744 |

FOREIGN PATENT DOCUMENTS

| | | | |
|---|---|---|---|
| JP | 2012198439 A | | 10/2012 |
| JP | 2015087575 A | * | 5/2015 |
| JP | 2015087575 A | | 5/2015 |

* cited by examiner

*Primary Examiner* — John W Miller
*Assistant Examiner* — Omer Khalid
(74) *Attorney, Agent, or Firm* — Holtz, Holtz & Volek PC

(57) ABSTRACT

A display device includes a power key, and at least one processor that executes following: determination processing that determines, when turning on a light source in response to a user's operation on the power key, whether a power supply supplying power is a predetermined power supply or not, and control processing that displays, when the determination processing determines that the power supply is the predetermined power supply, a power-on continuation confirmation screen and continues, in case of detection of a confirmation operation from the user according to the power-on continuation confirmation screen, lighting of the light source.

14 Claims, 8 Drawing Sheets

DISPLAY DEVICE, CONTROL METHOD OF DISPLAY DEVICE, AND RECORDING MEDIUM

BACKGROUND

Technical Field

This technical field relates to a display device, a control method of the display device, and a recording media.

Description of the Related Art

Display devices have been developed (for example, JP 2012-198439 A). In such display devices, portable display devices to be carried have been also studied recently. When a portable display device is carried in a bag, the power button of the portable display device can be accidentally pressed by something. If the display device starts display inside the bag, it consumes power unnecessarily.

SUMMARY

One of this aspect is a display device including a power key, and at least one processor that executes following: determination processing that determines, when turning on a light source in response to a user's operation on the power key, whether a power supply supplying power is a predetermined power supply or not, and control processing that displays, when the determination processing determines that the power supply is the predetermined power supply, a power-on continuation confirmation screen and continues, in case of detection of a confirmation operation from the user according to the power-on continuation confirmation screen, lighting of the light source.

DESCRIPTION OF THE EMBODIMENT

Hereinafter, an embodiment for carrying out the present invention will be described in detail with reference to the drawings.

Figure 1:
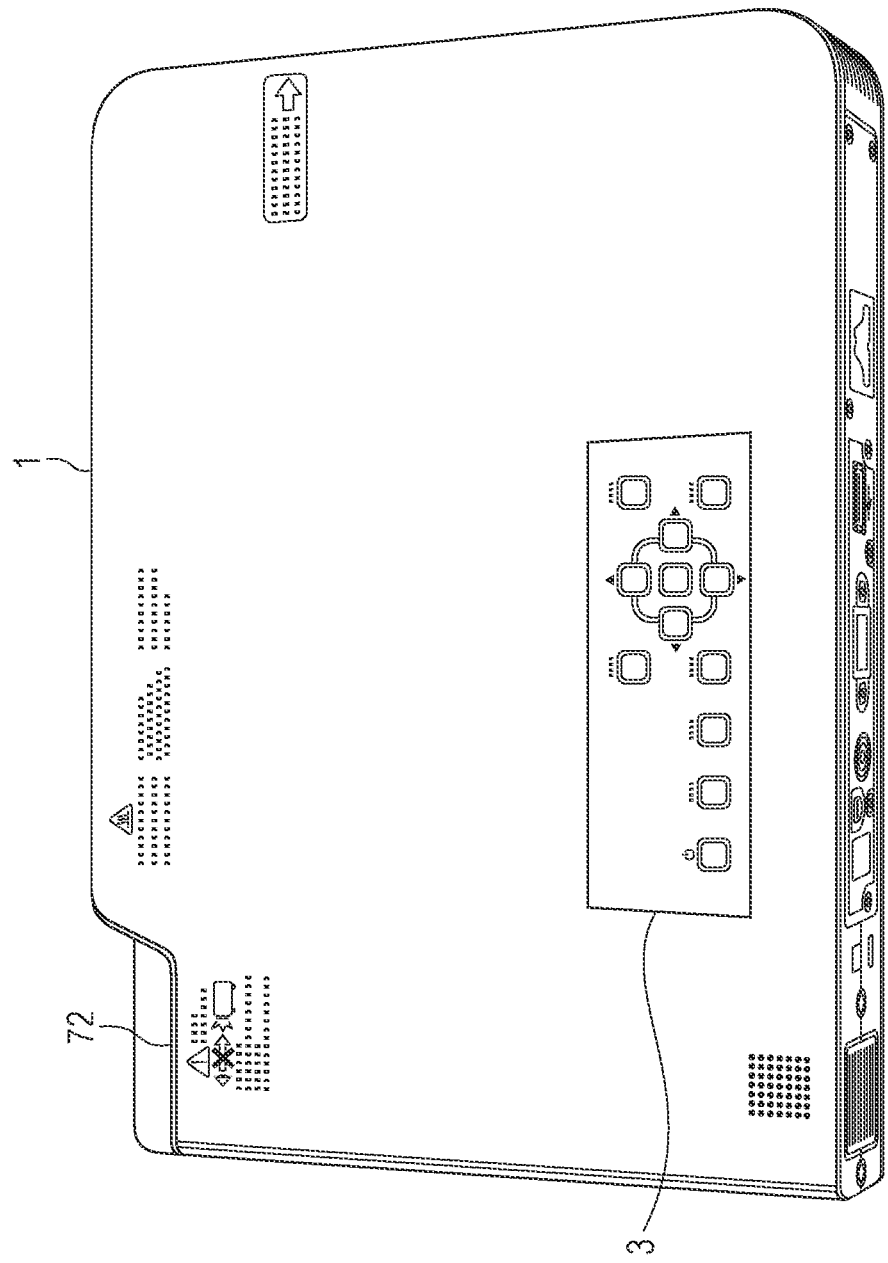
FIG. 1 is a top view of a projector according to the present embodiment.
Figure 2:
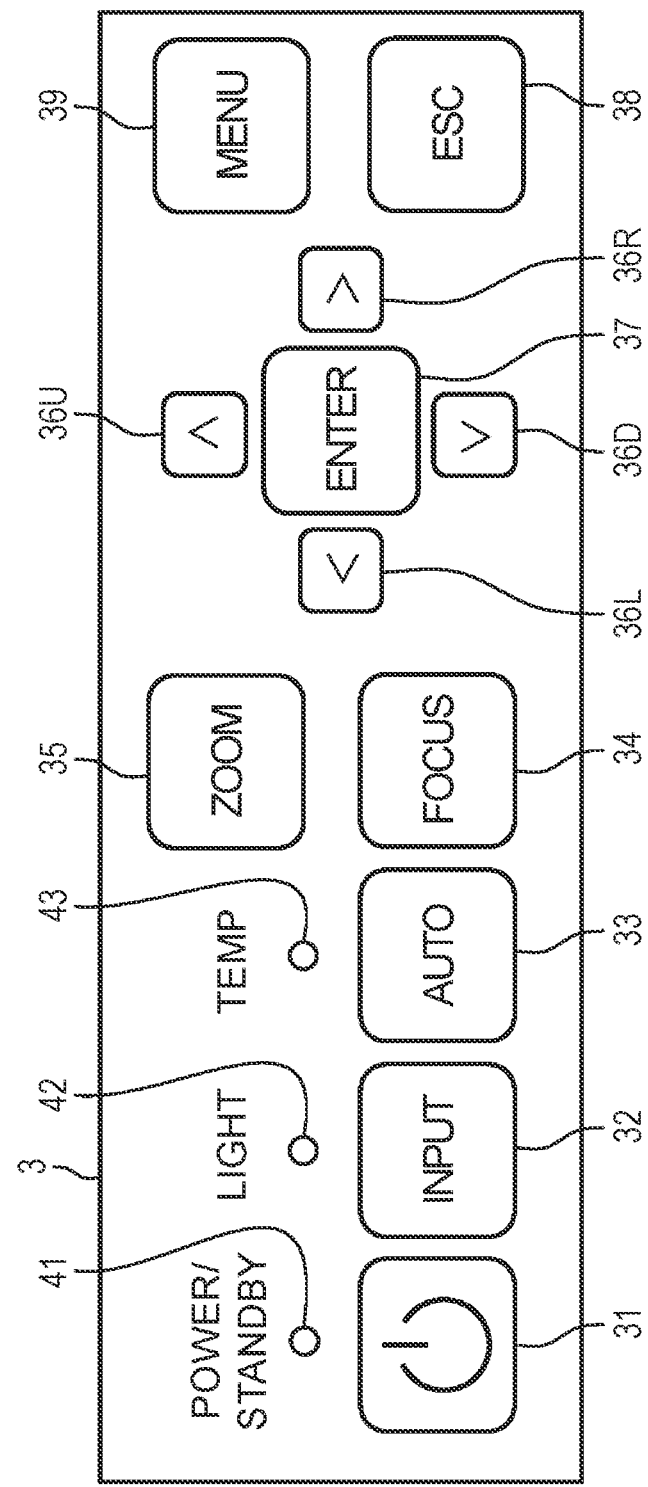
FIG. 2 is a diagram showing an operation input unit of the projector.

FIG. 1 is a top view of a projector (display device) according to the present embodiment. FIG. 2 is a diagram showing an operation input unit 3 of the projector.

A projector 1 has a substantially rectangular parallelepiped shape and is provided with a projection optical system 72 on the front left side. Note that, the upper part of FIG. 1 is the front side. On the upper surface of the projector 1, an operation input unit 3 including a plurality of buttons and indicators is provided.

As shown in FIG. 2, the operation input unit 3 includes a power key 31, an INPUT key 32, an AUTO key 33, a FOCUS key 34, a ZOOM key 35, a POWER/STANDBY indicator 41, a LIGHT indicator 42, and a TEMP indicator 43. The operation input unit 3 further includes a left key 36L, an up key 36U, a right key 36R, a down key 36D, an ENTER key 37, an ESC key 38, and a MENU key 39. Each key of the operation input unit 3 is implemented by a tactile switch whose pressing is detected when a person presses the operation unit.

The power key 31 is for switching on/off of the power. The POWER/STANDBY indicator 41 installed above the power key 31 indicates the on/off state of the power and the no-image-signal state by, for example, turning on/off or blinking a green-and-red light emitting diode (LED).

The INPUT key 32 is for manually switching an input source. The LIGHT indicator 42 above the INPUT key 32 indicates the statuses of a laser light source (display light source), which is a light source for image projection, an LED, and the like by, for example, turning on/off or blinking a green-and-red LED. The TEMP indicator 43 indicates whether the temperatures of the laser light source, which is the light source for image projection, the LED, and the like, are in a state suitable for projection by, for example, turning on/off or blinking a green-and-red LED.

Both the red lights of the LIGHT indicator 42 and the TEMP indicator 43 being on indicate that the power is automatically turned off because failure has occurred in the fan.

The light of the LIGHT indicator 42 being off and the red light of the TEMP indicator 43 being on indicate that the power is automatically turned off because failure has occurred in the system. Both the red lights of the LIGHT indicator 42 and the TEMP indicator 43 blinking every 0.5 seconds indicate that the power is automatically turned off because the light source have been turned off or have not been turned on.

The AUTO key 33 is for shifting to a mode for automatically switching the input source. The FOCUS key 34 is for setting the focus of a projected image. The ZOOM key 35 is for zooming up or down a projected image.

The left key 36L, the up key 36U, the right key 36R, and the down key 36D are for adjusting the focus or zooming in combination with the FOCUS key 34 or the ZOOM key 35 and for being operated as a pointer, a cursor, or the like depending on the situation to select a menu item or instruct a moving direction, such as a manual trapezoidal correction direction. The ENTER key 37 is for instructing the reflection of the setting on a setting screen described later.

The ESC key 38 is for canceling the operation at that time. The MENU key 39 is for instructing the display of various setting screens related to a projection operation.

Figure 3:
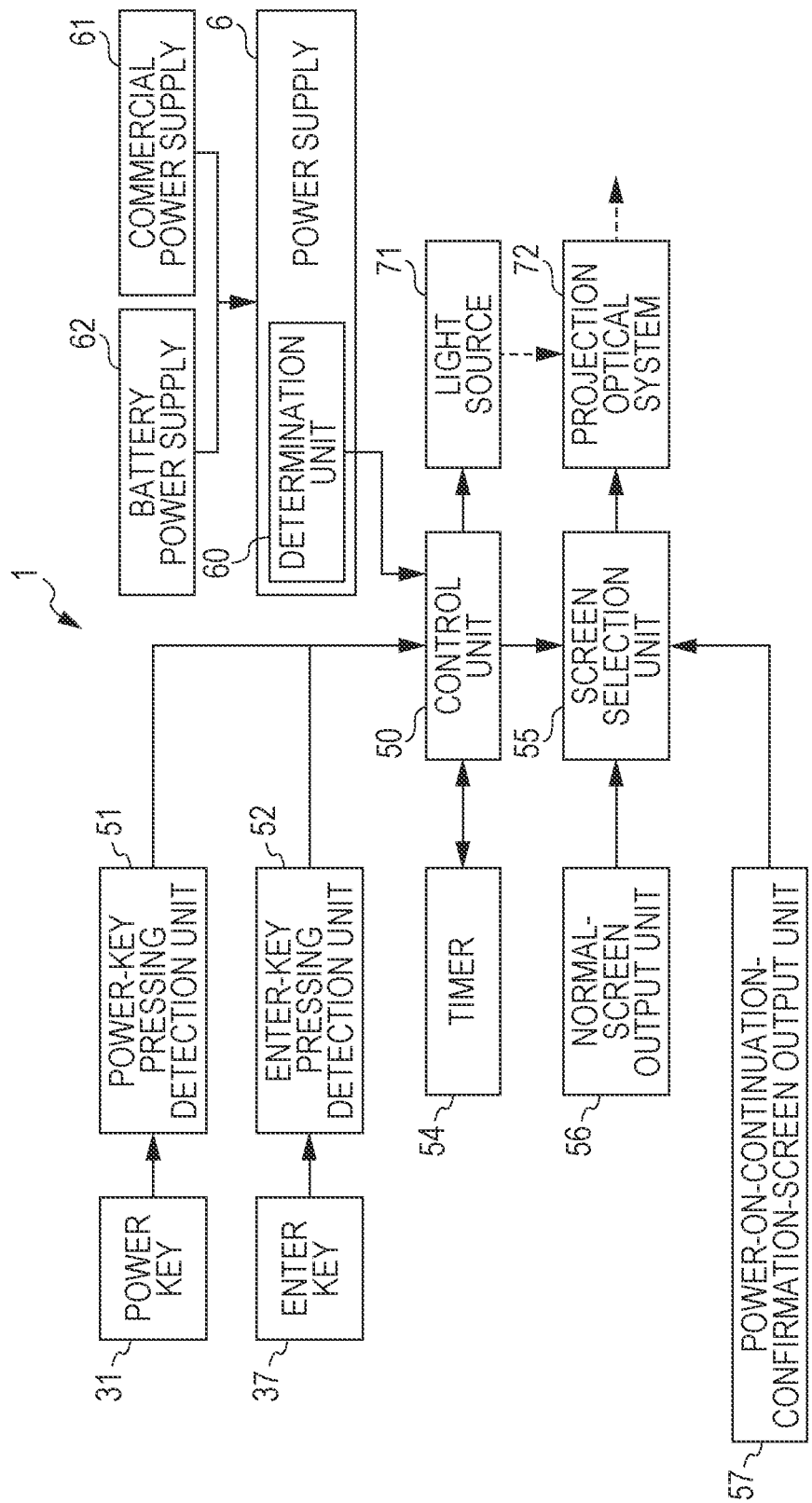
FIG. 3 is a block diagram showing a configuration of the projector according to the present embodiment.

FIG. 3 is a block diagram showing a configuration of the projector 1 according to the present embodiment.

The projector 1 includes a control unit 50, the power key 31, a power-key pressing detection unit 51, the ENTER key 37, an ENTER-key pressing detection unit 52, and a timer 54.

The control unit 50 is a central processing unit that integrally controls the projector 1. The timer 54 notifies the control unit 50 that the time set by the control unit 50 has elapsed. That is, the control unit 50 measures time with the timer 54.

The power-key pressing detection unit 51 removes the chattering of the power key 31 and then detects the pressing of the power key 31. The ENTER-key pressing detection unit 52 removes the chattering of the ENTER key 37 and then detects the pressing of the ENTER key 37.

When the power key 31 is pressed, the power-key pressing detection unit 51 removes the chattering, detects the pressing of the power key 31, and notifies the control unit 50.

Similarly, when the ENTER key 37 is pressed, the ENTER-key pressing detection unit 52 removes the chattering, detects the pressing of the ENTER key 37, and notifies the control unit 50.

The projector 1 further includes a screen selection unit 55, a normal-screen output unit 56, a power-on-continuation-confirmation-screen output unit 57, a power supply 6 to be connected to (powered by) a commercial power supply 61 as an AC power supply or a battery power supply 62 as a DC power supply, a light source 71, and a projection optical system 72.

The screen selection unit 55 is, for example, a DLP (registered trademark) type device and controls, when either the normal-screen output unit 56 or the power-on-continuation-confirmation-screen output unit 57 is selected, the digital mirror device according to the selection. The light source 71 emits light. The projection optical system 72 includes a plurality of lens groups, magnifies an incident optical image, and projects it on a projection surface such as a screen.

When the screen selection unit 55 is irradiated with the light emitted from the light source 71, the light when the individual mirrors of the digital mirror device are tilted to the ON state is magnified through the projection optical system 72, and is projected on a projection surface such as a screen.

The power supply 6 is connected to the commercial power supply 61 or mounted with the battery power supply 62 to supply power to the units of the projector 1. The commercial power supply 61 is a commercial AC power supply. The battery power supply 62 is, for example, a secondary battery or a primary battery and is mounted on the power supply 6 when the projector 1 is carried and used.

Since the units inside the projector 1 operate with direct current, it is necessary to convert alternating current (AC) voltage into direct current (DC) voltage to drive the projector 1 when the commercial power supply 61 as an AC power supply is used. In this case, an AC/DC conversion unit that is a circuit for converting AC voltage into DC voltage may be incorporated in the power supply 6 of the projector 1, or an adapter that is an externally attached adapter for conversion, that is, what is called an AC adaptor (AC-DC adapter) for converting an AC power supply to a DC power supply may be used. If an AC-output AC-AC adapter intended only for voltage transformation is used, it is necessary to provide an AC/DC conversion unit inside the power supply 6 of the projector 1.

The power supply 6 further includes a determination unit 60 that determines whether the battery power supply 62 is connected to the power supply 6. The determination unit 60 is a circuit that determines, for example, that the commercial power supply 61 is connected based on the AC/DC conversion unit being operating and that the battery power supply 62 is connected based on the AC/DC conversion unit being stopped. The determination result by the determination unit 60 is output to the control unit 50.

When the control unit 50 is notified of the pressing of the power key 31 and the determination unit 60 determines that the battery power supply 62 is connected, the control unit 50 causes the screen selection unit 55 to select the power-on-continuation-confirmation-screen output unit 57 and starts the timer 54 simultaneously with the start of the lighting of the light source 71. Note that the control unit 50 may cause the screen selection unit 55 to select the power-on-continuation-confirmation-screen output unit 57 and starts the timer 54 simultaneously with the start of the lighting of the light source 71 when the DC power supply is determined to be connected as well as when the battery power supply 62 is determined to be connected. At this time, the control unit 50 may turn on the light source 71 while reducing the output of the light source. The power-on continuation confirmation screen projected at this time is preferably a screen having a large proportion of the black area by reducing the light output as a whole as shown in the example in FIG. 4. It is desirable that the light output of the light source when the power-on continuation confirmation screen is projected is reduced to be lower than the light output of the light source when an input-signal screen is projected.

Thereafter, the control unit 50 waits for the ENTER-key pressing detection unit 52 to detect the pressing of the ENTER key 37. If the timer 54 times out while the control unit 50 is waiting for the ENTER key 37 to be pressed, the control unit 50 turns off the light source 71 and the power supply 6.

On under the condition of the detection of the pressing of the ENTER key 37, which is a confirmation operation from the user following the power-on continuation confirmation screen, before the timer 54 times out, the control unit 50 causes the screen selection unit 55 to select the normal-screen output unit 56 to continue the lighting of the light source 71 in order to operate as the normal projector 1. Here, the operation as a normal projector means to project an input-signal screen or a no-signal screen.

Here, the ENTER key 37 functions as a key for confirming the continuation of power-on. The key for confirming the continuation of power-on may be a key different from the power key 31 and is not limited to the ENTER key 37.

When the control unit 50 is notified of the pressing of the power key 31 and the determination unit 60 determines that the commercial power supply 61 is connected, the control unit 50 skips the display of the power-on continuation confirmation screen and continues the lighting of the light source 71. Accordingly, the user can start using the projector 1 by skipping the confirmation operation immediately after the power is on.

Figure 4:
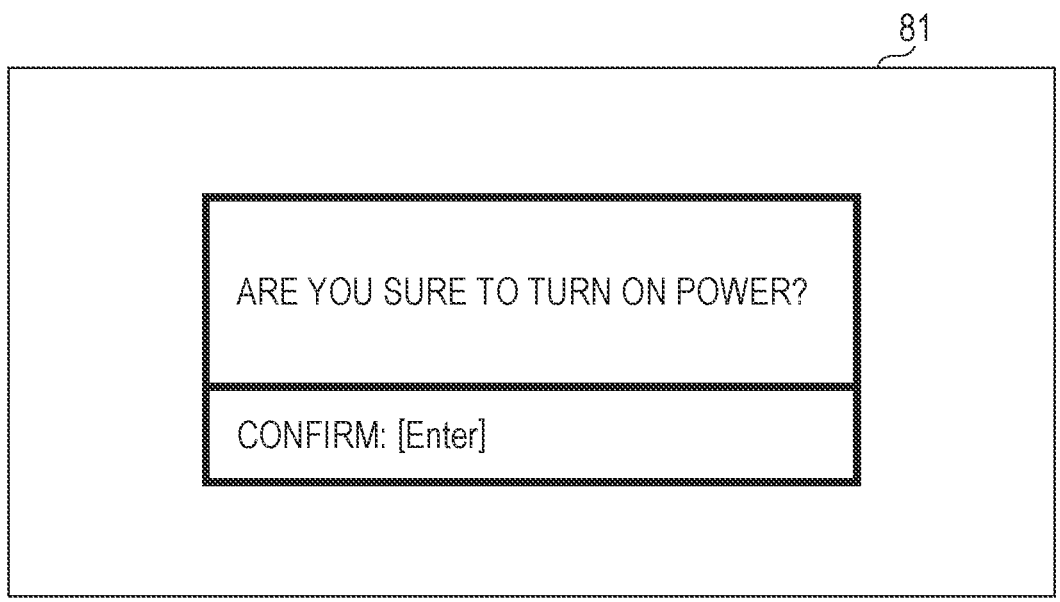
FIG. 4 is a diagram showing a power-on continuation confirmation screen.

FIG. 4 is a diagram showing a power-on continuation confirmation screen 81.

The background of the power-on continuation confirmation screen 81 is black, and a rectangle partitioned in the middle by a line is arranged. The guidance "Are you sure to turn on the power?" is displayed in the upper part of the rectangle, and "Confirm: [Enter]" is displayed in the lower part of the rectangle. When the user presses the ENTER key 37 following this guidance, the projection of the input-signal screen or the no-signal screen is started as a normal projector.

The power-on continuation confirmation screen 81 preferably has a proportion of black to have an amount of light that generates little heat and does not damage the storage case of the projector 1 if projected. Accordingly, the amount of heat at the time of the projection of the power-on continuation confirmation screen 81 is to be a predetermined value or less with which the damage to the storage case can be avoided.

Unlike a normal device, the projector 1 according to the present embodiment does not start operating as a normal projector only by pressing the power key 31. The power-on continuation confirmation screen 81 allows the operator of the projector 1 to easily know what kind of operation is needed for the projector 1 to operate as a normal projector.

Figure 5:
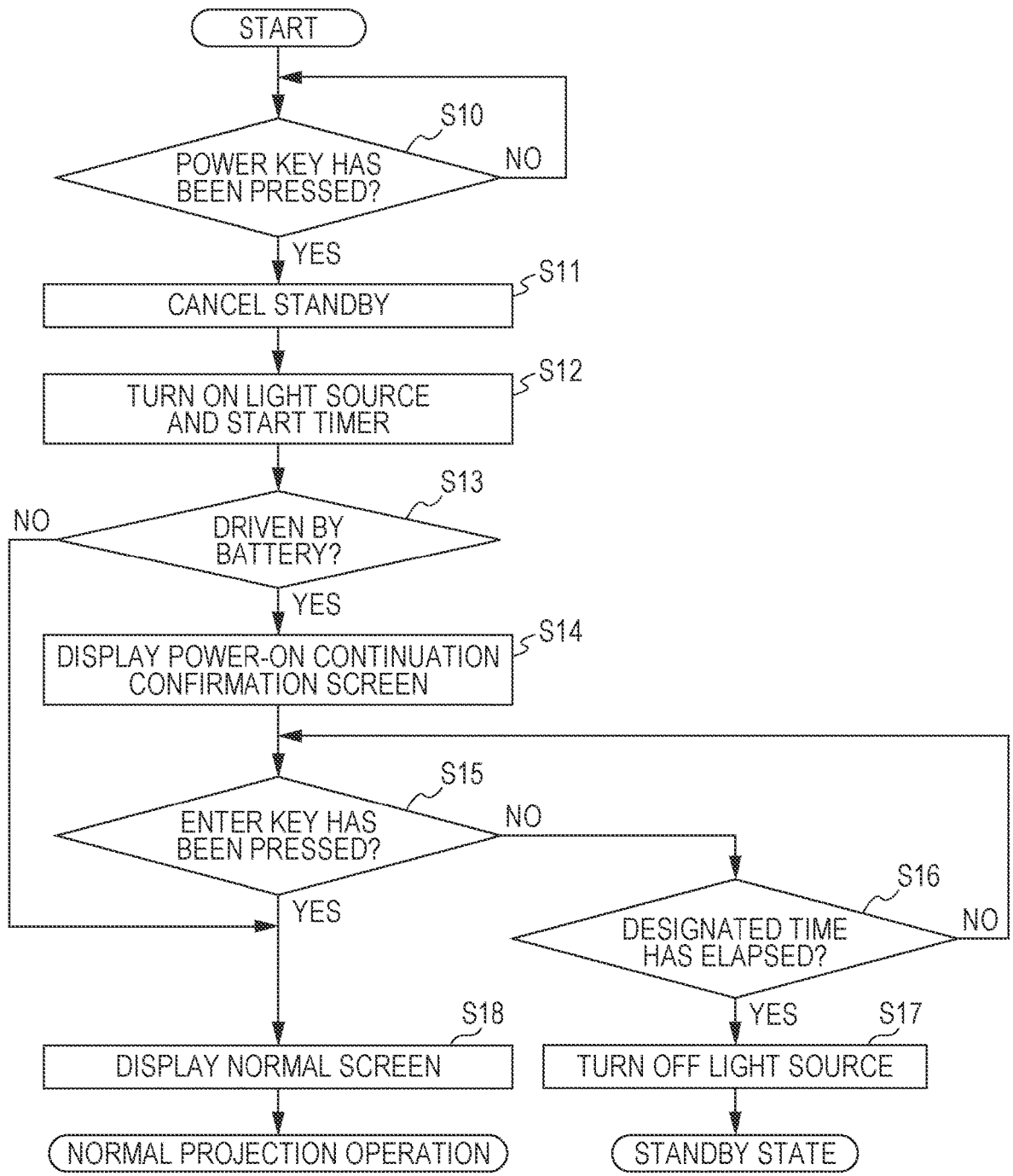
FIG. 5 is a flowchart showing power-on processing of the projector.

FIG. 5 is a flowchart showing power-on processing of the projector 1, and the block diagram in FIG. 3 is referred to as needed. This flowchart shows each processing when the central processing unit, which is the control unit 50, executes a control program of the projector 1.

At the start of the processing, the projector 1 is in a waiting state called a standby state or a sleep state in which the control unit 50 is operating although the light source 71 is not turned on.

The control unit 50 determines whether the power-key pressing detection unit 51 has detected the pressing of the power key 31 (S10). When the power-key pressing detection unit 51 has not detected the pressing of the power key 31 (No), the control unit 50 repeats the processing in step S10, and when the power-key pressing detection unit 51 has detected the pressing of the power key 31 (Yes), the control unit 50 cancels the standby state (S11). In addition, the control unit 50 turns on the light source 71 and starts the timer 54 (S12). The timer 54 measures a predetermined time after the projection of the power-on continuation confirmation screen.

In step S13, the determination unit 60 determines, when the lighting of the light source 71 (display light source) is started in response to the user operation, whether the power supply connected to the power supply 6 is a predetermined power supply, that is, whether the power supply 6 is driven by the battery power supply 62. When the commercial power supply 61 is connected to the power supply 6 to drive the power supply 6 and the battery power supply 62 is not connected (No), the control unit 50 proceeds to step S18, displays a normal screen, which is either the input-signal screen or the no-signal screen, and then shifts to a normal projection operation mode. When the battery power supply 62 is connected to the power supply 6 to drive the power supply 6 (Yes), the control unit 50 proceeds to step S14.

When the power supply 6 is driven by the commercial power supply 61, the control unit 50 skips the detection of the pressing of the ENTER key 37 and immediately displays the normal screen, which is either the input-signal screen or the no-signal screen. Accordingly, the user can skip an unnecessary confirmation operation when the power supply 6 is driven by the commercial power supply 61.

In step S14, the control unit 50 displays, when the determination unit 60 determines that the predetermined power supply is connected, the power-on continuation confirmation screen 81 in FIG. 4 by projection simultaneously with the start of the lighting of the light source 71. The control unit 50 further determines whether the ENTER-key pressing detection unit 52 has detected the pressing of the ENTER key 37 (S15).

When the ENTER key 37 has not been pressed (No), the control unit 50 proceeds to step S16 and determines whether a designated time has elapsed. Here, the control unit 50 determines whether the designated time has elapsed by the time-up of the timer 54. That is, the control unit 50 measures the predetermined time after the projection of the power-on continuation confirmation screen with the timer 54.

In step S16, the control unit 50 returns to the process in step S15 when the designated time has not elapsed (No). When the confirmation operation from the user following the power-on continuation confirmation screen has not been detected within the predetermined time, that is, when the designated time has elapsed (Yes), the control unit 50 turns off the light source 71 (display light source) at a predetermined timing (S17) and shifts to the standby state.

In step S15, when the ENTER key 37 has been pressed as the confirmation operation from the user following the power-on continuation confirmation screen (Yes), the control unit 50 proceeds to step S18, continues the lighting of the light source 71 to display the normal screen, which is either the input-signal screen or the no-signal screen, and shifts to the normal projection operation mode. Here, the ENTER-key pressing detection unit 52 functions as a confirmation-operation detection unit that detects a power-on confirmation operation.

When driven by the battery power supply 62, the projector 1 performs a normal projection operation by pressing the power key 31 and then pressing the ENTER key 37 within the designated time. The projector 1 does not perform the normal projection operation unless a predetermined key operation sequence is detected as described above. If the power key 31 is accidentally pressed inside the storage case, it is unlikely that the pressing of the ENTER key 37 is detected within the designated time. Thus, the projector 1 can distinguish the case where the power key 31 is pressed in a person's operation from the case where the power key 31 is accidentally pressed inside the storage case. Accordingly, if the power key 31 is pressed while the projector 1 is being carried, it is possible to prevent the projector 1 from being turned on in an erroneous operation.

<<Modification>>

In the above embodiment, when the operation input unit 3 is pressed inside the storage case and the pressing of both the power key 31 and the ENTER key 37 is detected, the projector 1 can be erroneously turned on. In such a case, other keys can also be pressed. In this modification, the case where the power key 31 is pressed in a person's operation is further distinguished from the case where the operation input unit 3 is accidentally pressed inside the storage case.

Figure 6:
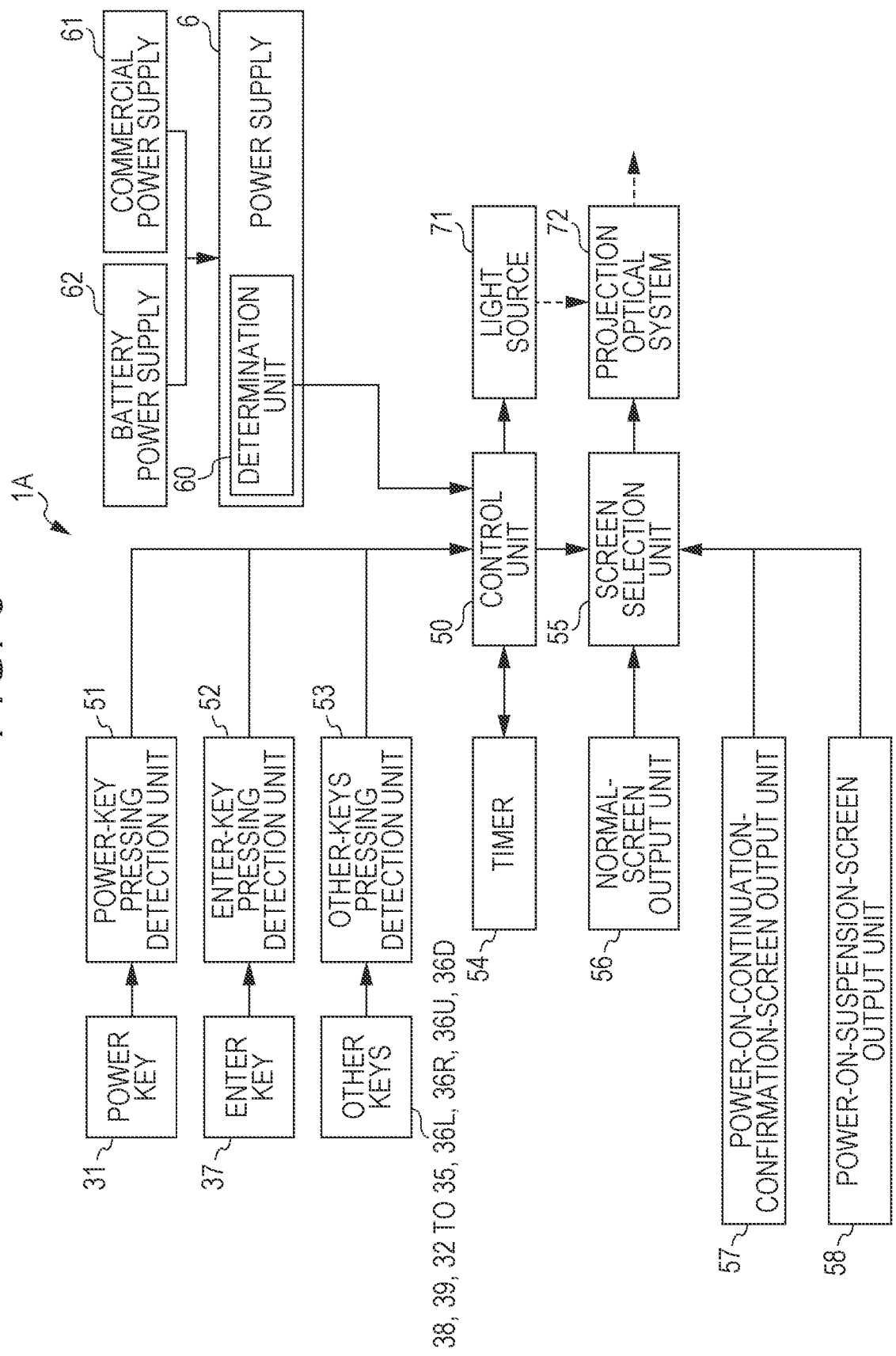
FIG. 6 is a block diagram showing a configuration of a projector in a modification.

FIG. 6 is a block diagram showing a configuration of a projector 1A in the modification.

In addition to the projector 1 shown in FIG. 3, the projector 1A in the modification further includes other keys, other-keys pressing detection unit 53, and a power-on-suspension-screen output unit 58.

The other keys are keys other than the power key 31 and ENTER key 37 and are the INPUT key 32, the AUTO key 33, the FOCUS key 34, the ZOOM key 35, the left key 36L, the up key 36U, the right key 36R, the down key 36D, the ESC key 38, and the MENU key 39.

Figure 7:
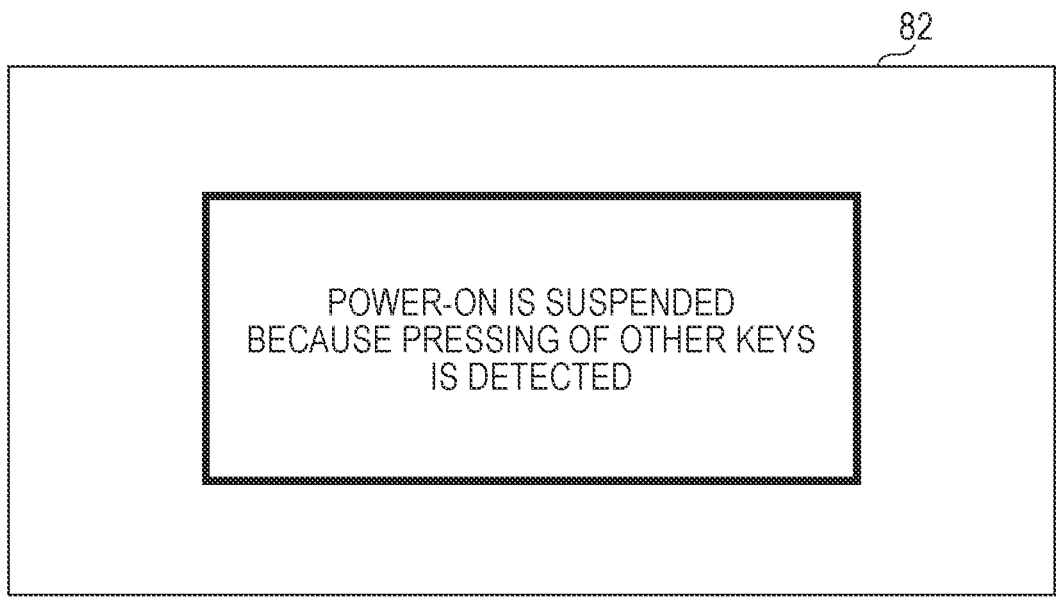
FIG. 7 is a diagram showing a power-on suspension screen.

FIG. 7 is a diagram showing a power-on suspension screen 82.

The background of the power-on suspension screen 82 is black, and a white rectangular frame is arranged. The guidance "Power-on is suspended because pressing of other keys is detected" is displayed in this rectangle. With this guidance, the user can detect that the power is turned on in an erroneous sequence. The projector 1A projects the power-on suspension screen 82 for a predetermined period of time and then transitions to the standby state.

The power-on suspension screen 82 preferably has a proportion of black to have an amount of light that generates little heat and does not damage the storage case of the projector 1A if projected. It is desirable that the light output of the light source when the power-on suspension screen 82 is projected is reduced to be lower than the light output of the light source when the input-signal screen is projected.

The power-on suspension screen 82 allows the operator of the projector 1A to recognize that the power-on is suspended due to an erroneous operation.

Figure 8:
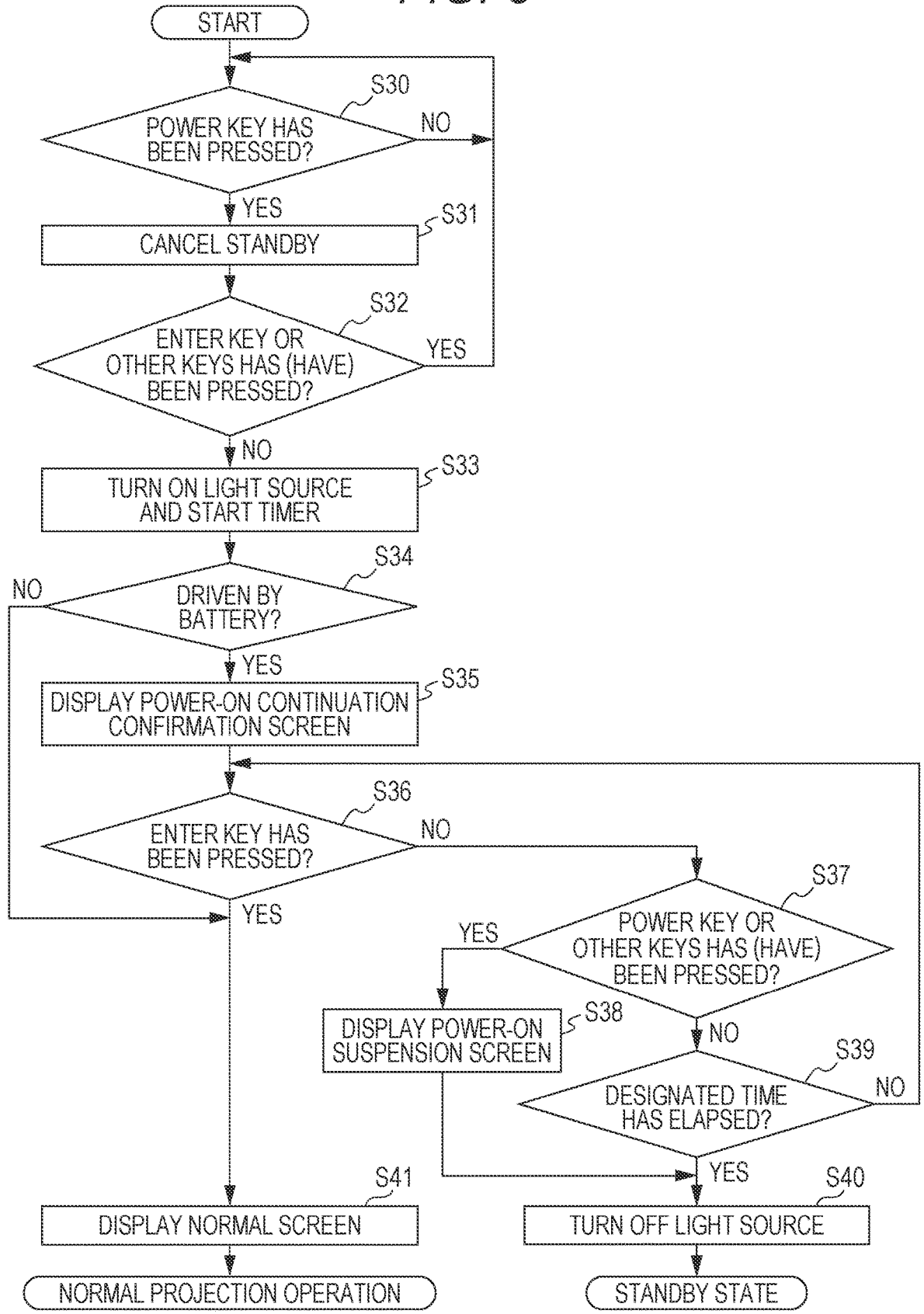
FIG. 8 is a flowchart showing power-on processing of the projector in the modification.

FIG. 8 is a flowchart showing power-on processing of the projector 1 A in the modification.

At the start of the processing, the projector 1A is in the standby state, and the control unit 50 is operating although the light source 71 is not turned on.

The control unit 50 determines whether the power-key pressing detection unit 51 has detected the pressing of the power key 31 (S30). When the power-key pressing detection unit 51 has not detected the pressing of the power key 31 (No), the control unit 50 repeats the processing in step S30, and when the power-key pressing detection unit 51 has detected the pressing of the power key 31 (Yes), the control unit 50 cancels the standby state (S31).

Then, the control unit 50 determines whether the pressing of the ENTER key 37 or the other keys has been detected by the ENTER-key pressing detection unit 52 or the other-keys pressing detection unit 53 (S32). When the pressing of the ENTER key 37 or the other keys has been detected (Yes), the control unit 50 returns to the process in step S30, or when the pressing of the ENTER key 37 or the other keys has not been detected (No), the control unit 50 proceeds to step S33.

When the power key 31 is pressed in a person's operation, the keys other than the power key 31 are not pressed. In contrast, if the operation input unit 3 is pressed inside the storage case, it is considered that not only the power key 31 but also the keys other than the power key 31 are pressed. The processing in the modification is for distinguishing, by detecting the pressing of the ENTER key 37 or the other keys when the power key 31 is pressed, the case where the power is turned on in a person's operation from the case where the other keys of the operation input unit 3 are accidentally pressed. The power of the projector 1A in the modification is not turned on regardless of whether the ENTER key 37 is pressed or not when the power key 31 and the other keys are accidentally pressed. Accordingly, it is possible to more preferably prevent the projector 1A from being erroneously turned on during transportation.

In step S33, the control unit 50 turns on the light source 71 and starts the timer 54. The timer 54 measures a predetermined time after the projection of the power-on continuation confirmation screen.

In step S34, the determination unit 60 determines, when the lighting of the display light source is started in response to the user operation, whether the power supply connected to the power supply 6 is a predetermined power supply, that is, whether the power supply 6 is driven by the battery power supply 62. When the commercial power supply 61 is connected to the power supply 6 to drive the power supply 6 and the battery power supply 62 is not connected (No), the control unit 50 proceeds to step S41, displays the normal screen, which is either the input-signal screen or the no-signal screen, and then shifts to the normal projection operation mode. When the battery power supply 62 is connected to the power supply 6 to drive the power supply 6 (Yes), the control unit 50 proceeds to step S35.

In step S35, the control unit 50 displays, when the determination unit 60 determines that the predetermined power supply, that is, the battery power supply 62 is connected, the power-on continuation confirmation screen 81 in FIG. 4 by projection simultaneously with the start of the lighting of the light source 71. The power-on continuation confirmation screen 81 may be projected immediately after the pressing of the power key in S30 or immediately after the determination that the power supply 6 is driven by the battery in S34. The control unit 50 further determines whether the ENTER-key pressing detection unit 52 has detected the pressing of the ENTER key 37 (S36).

When the ENTER key 37 has not been pressed (No), the control unit 50 proceeds to step S37.

In step S37, the control unit 50 determines whether the pressing of the power key 31 or the other keys has been detected (S37). When the pressing of the power key 31 or the other keys has been detected (Yes), the control unit 50 displays the power-on suspension screen 82 in FIG. 7 (S38), turns off the light source 71 (S40), and shifts to the standby mode. When the pressing of the power key 31 or the other keys (No) has not been detected, the control unit 50 proceeds to step S39.

In step S39, the control unit 50 determines whether the designated time has elapsed. Here, the control unit 50 determines whether the designated time has elapsed by the time-up of the timer 54. When the designated time has not elapsed (No), the control unit 50 returns to the process in step S36. When the designated time has passed (Yes), the control unit 50 turns off the light source 71 (S40) and shifts to the standby state.

In step S36, when the ENTER key 37 has been pressed as the confirmation operation from the user following the power-on continuation confirmation screen (Yes), the control unit 50 proceeds to step S41 to continue the lighting of the light source 71. That is, the control unit 50 displays the normal screen, which is either the input-signal screen or the no-signal screen, and then shifts to the normal projection operation mode.

The projector 1A in the modification can detect the case where the power key 31 is accidentally pressed at the same time of pressing the ENTER key 37 or the other keys are also pressed and notify the user of such a case with the power-on suspension screen 82 in FIG. 7.

In addition, the projector 1A can more certainly distinguish the case where the power key 31 is pressed in a person's operation from the case where the power key 31 is accidentally pressed. Accordingly, if the power key 31 is pressed while the projector 1 is being carried, it is possible to prevent the projector 1 from being turned on in an erroneous operation.

(Modification)

The present invention is not limited to the above embodiment, can be modified without departing from the gist of the present invention, and includes, for example, the following (a) to (c):

(a) Heat generation may be reduced by reducing the amount of light of the light source during the projection of the confirmation screen.

(b) Performing the confirmation of power-on is not limited to the ENTER key implemented by a tactile switch, and the confirmation may be performed by detecting any operation.

(c) The state to which the control unit shifts when the confirmation of power-on fails is not limited to the standby state in which the power supply of the projector and a part of the control unit are operating and may be a power-off state in which the power supply of the projector is turned off.

The above embodiment exemplifies the display light source for performing projection using the light source of the projector as an example for preventing the projector from being turned on in an erroneous operation if the power button is pressed while the projector is being carried. However, the invention is not limited to this configuration. A similar effect can be obtained with, for example, a display device using a display light source for displaying a screen (or projects a screen), such as a liquid crystal display that illuminates a liquid crystal from the back with a backlight using white light emitting LEDs, an EL display that uses fluorescence or phosphorescence emitted by applying voltage as a light emitting source, or the like.

What is claimed is:

1. A display device comprising:
a power key; and
at least one processor that is configured to:
detect a user operation of the power key in a state in which a light source is not turned on;
turn on the light source in response to detecting the user operation of the power key;
after turning on the light source and in response to detecting the user operation of the power key, determine whether a power supply supplying power is a battery power supply or an external commercial power supply;
display, in response to detecting the user operation of the power key and in response to a determination that the power supply supplying power is the battery power supply, a power-on continuation confirmation screen to prompt a user to enter a confirmation operation to continue lighting the light source;
detect whether a user enters the confirmation operation to continue lighting the light source; and
continue, in response to detecting the confirmation operation from the user, lighting of the light source,
wherein the at least one processor is further configured to, in response to a determination that the power supply supplying power is the external commercial power supply, skip the display of the power-on continuation confirmation screen and continue the lighting of the light source.

2. The display device according to claim 1, wherein the at least one processor is configured to, when the confirmation operation from the user is not detected within a predetermined time, turn off the light source at a predetermined timing.

3. The display device according to claim 1, wherein the at least one processor is configured to, in response to detecting the confirmation operation within a predetermined time after the display of the power-on continuation confirmation screen, display an input-signal screen or a no-signal screen.

4. The display device according to claim 2, wherein the at least one processor is configured to, in response to detecting the confirmation operation within a predetermined time after the display of the power-on continuation confirmation screen, display an input-signal screen or a no-signal screen.

5. The display device according to claim 1, wherein the at least one processor is configured to, in response to a determination that the power supply supplying power is the external commercial power supply and in response to detection of the user operation of the power key, turn on the light source to display an input-signal screen or a no-signal screen.

6. The display device according to claim 2, wherein the at least one processor is configured to, in response to a determination that the power supply supplying power is the external commercial power supply and in response to detection of the user operation of the power key, turn on the light source to display an input-signal screen or a no-signal screen.

7. The display device of claim 5, wherein the at least one processor is configured to not turn on the light source in a case where a user operation of a key other than the power key is detected within a predetermined time after the detection of the user operation of the power key.

8. The display device of claim 6, wherein the at least one processor is configured to not turn on the light source in a case where a user operation of a key other than the power key is detected within a predetermined time after the detection of the user operation of the power key.

9. The display device according to claim 1, wherein the light source when turned off is in a standby state or a sleep state in which the at least one processor remains operable.

10. The display device according to claim 2, wherein the light source when turned off is in a standby state or a sleep state in which the at least one processor remains operable.

11. The display device according to claim 1, wherein the at least one processor is configured to control so that light output of the light source is lower when the power-on continuation confirmation screen is displayed than when an input-signal screen is displayed.

12. The display device according to claim 1, wherein a heat amount when the power-on continuation confirmation screen is displayed is a predetermined value or less.

13. A control method of a display device including a power key and at least one processor, the method being executed by the at least one processor, and the method comprising:
detecting a user operation of the power key in a state in which a light source is not turned on;
turning on the light source in response to detecting the user operation of the power key;
after turning on the light source and in response to detecting the user operation of the power key, determining whether a power supply supplying power is a battery power supply or an external commercial power supply;
displaying, in response to detecting the user operation of the power key and in response to a determination that the power supply supplying power is the battery power supply, a power-on continuation confirmation screen to prompt a user to enter a confirmation operation to continue lighting the light source;
detecting whether a user enters the confirmation operation to continue lighting the light source; and
continuing, in response to detecting the confirmation operation from the user, lighting of the light source,
wherein the method further comprises skipping the displaying of the power-on continuation confirmation screen and continuing the lighting of the light source, in response to a determination that the power supply supplying power is the external commercial power supply.

14. A non-transitory recording medium recording a program readable by at least one processor of a display device including a light source and a power key, the program being executable to control the at least one processor to execute processes comprising:
detecting a user operation of the power key in a state in which the light source is not turned on;
turning on the light source in response to detecting the user operation of the power key;
after turning on the light source and in response to detecting the user operation of the power key, determining whether a power supply supplying power is a battery power supply or an external commercial power supply;
displaying, in response to detecting the user operation of the power key and in response to a determination that the power supply supplying power is the battery power supply, a power-on continuation confirmation screen to prompt a user to enter a confirmation operation to continue lighting the light source;

detecting whether a user enters the confirmation operation to continue lighting the light source; and continuing, in response to detecting the confirmation operation from the user, lighting of the light source, wherein the processes further comprise skipping the displaying of the power-on continuation confirmation screen and continuing the lighting of the light source, in response to a determination that the power supply supplying power is the external commercial power supply.

\* \* \* \* \*